UNITED STATES PATENT OFFICE.

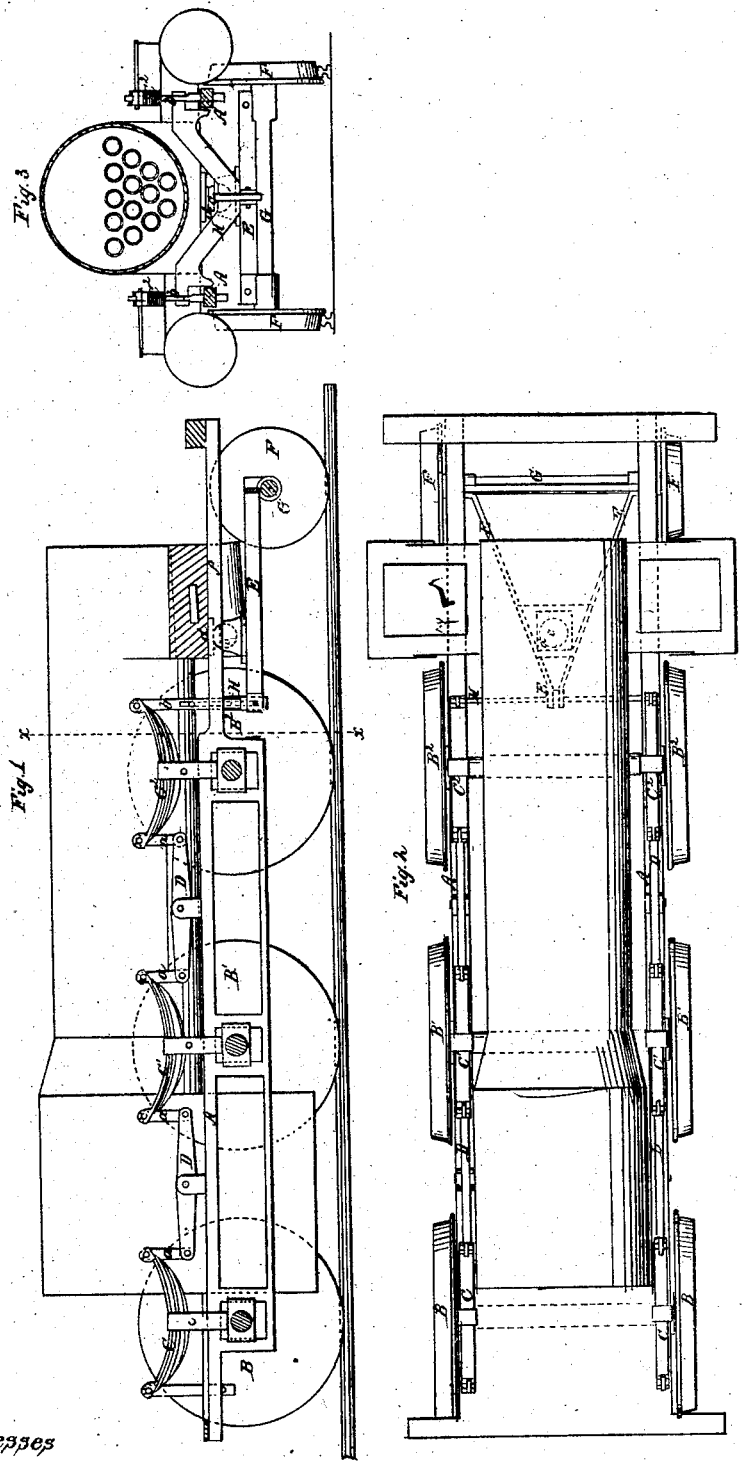

JOHN L. WHETSTONE, OF CINCINNATI, OHIO.

RUNNING-GEAR OF LOCOMOTIVE-ENGINES.

Specification of Letters Patent No. 27,850, dated April 10, 1860.

*To all whom it may concern:*

Be it known that I, JOHN L. WHETSTONE, of Cincinnati, in the county of Hamilton and State of Ohio, have invented a new and useful Improvement in the Running-Gear of Locomotive-Engines; and I do hereby declare that the following is a full, clear, and exact description of the same, reference being had to the accompanying drawings, forming part of this specification, in which—

Figure 1, is a longitudinal vertical section of a locomotive with my improved running gear the plane of section being just within the wheels. Fig. 2, is a plan of the same. Fig. 3 is a transverse vertical section of the same in the plan indicated by the line $x, x$, of Fig. 1.

Similar letters of reference indicate corresponding parts in the several figures.

To enable others to make and use my invention I will proceed to describe its construction and operation.

A, is the main frame.

B, B′, B², are the driving wheels, of which there are three pairs in the example represented though my invention is not necessarily limited to the use of this number.

C, C, C′, C′, C², C², are the springs applied in the usual manner over the driving wheels and connected by levers D, D, and links $a, a$, in a well known manner.

E is the vibrating truck frame, and F, F, the pair of truck wheels. The said frame E, is represented as being of triangular form as represented in the plan Fig. 2, the front end which contains the boxes for the axle G, of the wheels F, F, forming the base of the triangle, and the rear end being connected with a strong cross bar H, whose ends are connected by hangers $b, b$, with the springs C², C², of the forward drivers. The ends of the cross bar H are notched as shown and enter into slots in the hangers ($b\ b$) the ends of said cross bar H having a slight lateral play or movement through said slots, to allow for the lateral turning or vibration of the frame E, when passing curves. The said frame E is attached to the boiler or to the main frame by a center bolt $c$, upon which it is capable of vibrating horizontally and around which there is provided on the said frame the bearing $d, d$, for the front portion of the engine. Instead of the vibrating truck frame E, being of triangular form, it may be square and attached directly to the hangers $b, b$, the cross bar H, being dispensed with and in that case the engine may have bearings on the two sides of the said frame on segment levers or rollers instead of at $d$, such bearings permitting the frame to vibrate to a certain extent vertically like the central bearing $d$ through the central bearing is preferable for uneven roads.

The center bolt connection must be retained with either arrangement of the bearing or bearings as an essential feature of the invention. The bearing $d$ being placed but a small distance forward of the point or line of junction of the frame E, with the cross bar H, or hangers ($b\ b$) the lateral movement of the rear end of the frame, whether square or triangular in form, will be much less than that of the front end, when passing any curve. To accommodate the lateral movement of the frame the rear part of frame E, at the aperture through which the cross bar H passes, may be beveled; or if the square form of frame is employed, the ends of the frame where they connect with hangers ($b\ b$) may be made to slide laterally a little, in said hangers, or when a cross bar H is employed the ends of the latter may be made to slide laterally in said hangers as herein shown and described, and thus allow of said lateral vibration.

The operation of this mode of supporting the front end of the engine, as compared with the ordinary mode is as follows. In the six wheeled coupled engines as generally made, the whole weight of the engine rests upon the drivers, and the center of gravity of the boiler, frame and cylinders and their appendages is forward of the middle pair of drivers, and consequently a greater load is thrown upon the forward pair of drivers than upon either of the other pairs, and the great amount of weight overhanging the forward drivers gives an unsteady and pitching motion to the engine. All this is remedied by my arrangement by relieving the forward drivers of their excess of load and placing the most forward point of support much farther forward viz, at the bearing or bearings $d$.

The vibrating truck frame assists in turning curves as the pilot wheels F, F, are permitted by the vibration of the truck frame on center bolt $c$ to accommodate themselves easily to the curve, their axle placing itself in a position approximating to the direction of the radius of the curve, and thus the said wheels assist the forward drivers in turning the curve and relieve the flanges of the latter wheels of much wear. Engines have been built with a pair of pilot wheels mounted in the main frame and with equalizing bars between them and the forward drivers, but in such case all the axles have been kept rigidly parallel thus making a very long wheel base and consequently imposing a heavy duty on the forward flanges. In my arrangement the rigid wheel base is confined to the drivers, while the forward pilot wheels F, F, are free to accommodate themselves, laterally to the curves and also to leave their parallelism with all the other axles. My arrangement also dispenses with a considerable portion of the unnecessary dead weight of the four wheeled truck and at the same time gives a greater effective weight to produce adhesion to the rails in consequence of the system of distribution.

What I claim as my invention and desire to secure by Letters Patent, is,—

The combination of the truck frame E, with the springs $C^2$, of the front drivers, substantially as and for the purpose herein shown and described.

JOHN L. WHETSTONE.

Witnesses:
  HENRY WARE,
  THADDEUS BREW.